United States Patent
Wang et al.

(10) Patent No.: US 9,900,120 B2
(45) Date of Patent: Feb. 20, 2018

(54) CLOCK SYNCHRONIZATION METHOD AND APPARATUS

(71) Applicant: ZTE CORPORATION, Shenzhen, Guangdong Province (CN)

(72) Inventors: Lilin Wang, Shenzhen (CN); Shengnan Yan, Shenzhen (CN); Yangfeng Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/321,736

(22) PCT Filed: Nov. 3, 2014

(86) PCT No.: PCT/CN2014/090187
§ 371 (c)(1),
(2) Date: Mar. 20, 2017

(87) PCT Pub. No.: WO2015/196685
PCT Pub. Date: Dec. 30, 2015

(65) Prior Publication Data
US 2017/0195076 A1 Jul. 6, 2017

(30) Foreign Application Priority Data

Jun. 26, 2014 (CN) .......................... 2014 1 0303131

(51) Int. Cl.
*H04J 3/06* (2006.01)
(52) U.S. Cl.
CPC .......... *H04J 3/0697* (2013.01); *H04J 3/0667* (2013.01)
(58) Field of Classification Search
None
See application file for complete search history.

(56) References Cited

U.S. PATENT DOCUMENTS 7,561,598 B2 * 7/2009 Stratton ............... H04L 41/06
370/339
8,335,861 B2 * 12/2012 Sun ...................... H04J 3/0673
370/455
(Continued)

FOREIGN PATENT DOCUMENTS

CN 101447861 A 6/2009
CN 101459502 A 6/2009
(Continued)

OTHER PUBLICATIONS

Brian R. Calder et al., "Ultraprecise Absolute Time Synchronization for Distributed Acquisition Systems", IEEE Journal of Oceanic Engineering, vol. 32, No. 4, Oct. 2007, XP011203624.
(Continued)

*Primary Examiner* — Minh-Trang Nguyen
(74) *Attorney, Agent, or Firm* — Ling Wu; Stephen Yang; Ling and Yang Intellectual Property

(57) ABSTRACT

The present disclosure provides a clock synchronization method and a clock synchronization apparatus. Herein the method includes: a physical layer device acquires a synchronization message used for a device to be synchronized to implement clock synchronization; and the physical side device transmits the synchronization message to the device to be synchronized. By means of the abovementioned technical solution provided by the present disclosure, the problems of small user capacity of the load and high synchronization cost resulted from the clock synchronization method in existing technologies are solved, the insufficient user capacity of the load caused by the limit of the CPU architecture is avoided, and the bandwidth resource of the Ethernet is utilized to the maximum extent.

7 Claims, 5 Drawing Sheets

(56) References Cited

U.S. PATENT DOCUMENTS

| | | | |
|---|---|---|---|
| 8,472,370 B2* | 6/2013 | Shin | H04J 3/0644 370/326 |
| 8,549,341 B2 | 10/2013 | Shahid et al. | |
| 2005/0207387 A1* | 9/2005 | Middleton | H04J 3/0664 370/347 |
| 2009/0310726 A1 | 12/2009 | Alankry et al. | |
| 2009/0312041 A1* | 12/2009 | Tseng | H04M 1/72552 455/466 |
| 2010/0040090 A1* | 2/2010 | Lee | H04J 3/0673 370/503 |
| 2013/0227008 A1* | 8/2013 | Yang | G06F 1/12 709/204 |
| 2014/0064297 A1 | 3/2014 | Hirota | |
| 2014/0169792 A1* | 6/2014 | Lee | H04J 3/0673 398/66 |

FOREIGN PATENT DOCUMENTS

| | | |
|---|---|---|
| CN | 103532970 A | 1/2014 |
| CN | 103684739 A | 3/2014 |
| WO | 2006093460 A1 | 9/2006 |

OTHER PUBLICATIONS

Steven E. Butner et al. "Nanosecond-scale Event Synchronization over Local-area Networks", Local Computer Networks, 2002, Proceedings. LCN 2002. 27th Annual IEEE Conference on Nov. 6-8, 2002, XP010628175.

* cited by examiner

| Power | Expansion board | Expansion board | FAN |
|---|---|---|---|
| | Expansion board | Expansion board | |
| | Slave clock board | Expansion board | |
| | Master clock board | Expansion board | |

CLOCK SYNCHRONIZATION METHOD AND APPARATUS

TECHNICAL FIELD

The present disclosure relates to the field of communications, and in particular relates to a clock synchronization method and a clock synchronization apparatus.

BACKGROUND

The full name of IEEE 1588 is "Standard for a Precision Clock Synchronization Protocol for Networked Measurement and Control Systems" (IEEE 1588 Precision Clock Synchronization Protocol), which is simply referred to as Precision Timing Protocol (PTP). Clocks of all nodes in a network are synchronized periodically through a synchronization signal such that systems based on Ethernet achieve precise synchronization and synchronization is realized between each system. Synchronization precision may be in the range of microsecond or even lower.

IEEE 1588 Clock Synchronization generally adopts the Global Navigation Satellite System (GNSS) or Building Integrated Timing System (BITS) clock as a clock source, and provides frequency and phase synchronization for base stations through a Base Station Controller (BSC)/Radio Network Controller (RNC). This solves the problems that traditional wireless services have high cost, inconvenient antenna erection and the like in GNSS frequency synchronization and phase synchronization time services.

The precision of the IEEE 1588 synchronization technology is closely related to the time stamp information carried in the 1588 message; the closer to the real transmitting time the time stamp information is, the higher synchronization precision is. IEEE 1588 protocol (IEEE STD 1588-2008) gives an application example of time stamp, as shown in FIG. 1. Message framing is completed at the application layer of the Ethernet architecture. The time stamp may be added to the 1588 message at any point of the application layer, Media Access Control (MAC) layer (which may be understood as the data link layer) and physical (PHY) layer. It is suggested to complete the time stamp update of the message transmitted out by the application layer through a hardware assist function at the PHY layer. Herein, OS shown in FIG. 1 may be understood as the abbreviation of Operating System.

FIG. 1 is a diagram of 1588 message time stamp processing according to existing technologies. According to the application architecture of FIG. 1, the Central Processing Unit (CPU) of systems such as BSC/RNC completes the receiving and transmitting process of a 1588 message. The 1588 message time stamp update is completed through a hardware assist function such as programmable logic or PHY (as shown in FIG. 2), etc., so that time synchronization of the entire Ethernet system is achieved.

When the CPU of BSC/RNC receives and transmits a message, software interrupt is needed to drive the completion. Limited by the architecture of the CPU processing system, the user capacity loaded by the BSC/RNC serving as the 1588 master clock is limited. At present, in existing IEEE 1588 synchronization technologies, BSC/RNC can merely load dozens of users. Even the specialized high-performance IEEE 1588 synchronization server is difficult to achieve a load of more than 1000 users.

The limit problem for the user capacity loaded by the 1588 master clock of the BSC/RNC system is particularly acute in the large-scale networking applications of femto/micro stations. The incapability of high-capacity intensive time services causes existing femto/micro station networking schemes not to reduce the time service cost to the greatest extent.

In view of the problems of small user capacity of the load and high synchronization cost resulted from the clock synchronization method in the existing technologies, no effective solution has been proposed yet.

SUMMARY

In view of the problems of small user capacity of the load and high synchronization cost resulted from the clock synchronization method in the existing technologies and the problem that no effective solution has been proposed yet, the present disclosure provides a clock synchronization method and a clock synchronization apparatus to at least solve the abovementioned problems.

In order to achieve the abovementioned purpose, according to one embodiment of the present disclosure, a clock synchronization method is provided, herein a physical layer device acquires a synchronization message used for a device to be synchronized to implement clock synchronization. And the physical side device transmits the synchronization message to the device to be synchronized.

Alternatively, the step that the physical layer device acquires the synchronization message used for the device to be synchronized to implement clock synchronization includes that: the physical layer device generates an initial message; the physical layer device acquires a reference time for synchronization and determines the time stamp of the initial message according to the reference time; and the time stamp is added in the initial message to obtain the synchronization message.

Alternatively, after the physical layer device acquires the synchronization message used for the device to be synchronized to implement clock synchronization, the method further includes that: the physical layer device generates a response message according to the synchronization message, herein the response message is used for notifying the device to be synchronized that the physical layer device has accepted the request of the device to be synchronized for implementing clock synchronization.

Alternatively, the step that the time stamp is added in the initial message to obtain the synchronization message includes that: the physical layer device judges the priorities of a signaling message from a CPU and the initial message when the initial message and the signaling message arrive at the same time; after judging that the priority of the initial message is higher than the priority of the signaling message, the time stamp is added in the initial message to determine the synchronization message.

Alternatively, the step that the physical layer device acquires the reference time for synchronization includes: determining the reference time according to at least one of the following: local clock source, the Global Navigation Satellite System GNSS or Building Integrated Timing System BITS.

Alternatively, the step that the physical layer device acquires the reference time for synchronization includes that: the physical layer device receives the reference time acquired by an expansion board from the master clock of the physical layer device.

In order to achieve the abovementioned purpose, according to another embodiment of the present disclosure, a clock synchronization apparatus is further provided, applied to a physical layer device, and includes the following modules An acquisition module is arranged to acquire a synchronization message used for a device to be synchronized to implement clock synchronization. A transmitting module is arranged to transmit the synchronization message to the device that is to be synchronized.

Alternatively, the acquisition module includes the following units. A generation unit is arranged to generate an initial message. An acquisition unit is arranged to acquire a reference time for synchronization and determine the time stamp of the initial message according to the reference time. An adding unit is arranged to add the time stamp into the initial message to determine the synchronization message.

Alternatively, the adding unit includes the following subunits. A judgment subunit is arranged to judge the priorities of a signaling message from a CPU and the initial message when the initial message and the signaling message arrive at the same time. A determination subunit is arranged to add the time stamp into the initial message to determine the synchronization message, after judging that the priority of the initial message is higher than the priority of the signaling message.

Alternatively, the acquisition unit, which is arranged to acquire the reference time for synchronization, determines the reference time according to at least one of the following: local clock source, the Global Navigation Satellite System GNSS or Building Integrated Timing System BITS.

Alternatively, the acquisition unit is further arranged to receive the reference time acquired by an expansion board from the master clock of the physical layer device.

With the present disclosure, a technical scheme is adopted that the synchronization message used for the device to be synchronized to implement clock synchronization is acquired through a physical layer device, but through a CPU, the problems of small user capacity of the load and high synchronization cost resulted from the clock synchronization method in existing technologies are solved, the insufficient user capacity of the load caused by the limit of the CPU architecture is avoided, and the bandwidth resource of the Ethernet is utilized to the maximum extent.

BRIEF DESCRIPTION OF DRAWINGS

For a better understanding of the present disclosure, accompanying drawings described hereinafter are provided to constitute one part of the application. The schematic embodiments of the present disclosure and the description thereof are used to illustrate the present disclosure but to limit the present disclosure improperly. In the accompanying drawings.

SPECIFIC EMBODIMENTS

The present disclosure is described below in detail by reference to the accompanying drawings in conjunction with embodiments. It shall be illustrated that the embodiments in the application and the characteristics of the embodiments may be combined each other if no conflict is caused.

The other features and advantages of the present disclosure will be illustrated in the specification hereinafter and partially will become more apparent from a careful reading of the specification or become understandable by implementing the present disclosure. The purpose and other advantages of the present disclosure can be realized and obtained through the structure specified in the specification, claims and accompany drawings.

Figure 1:
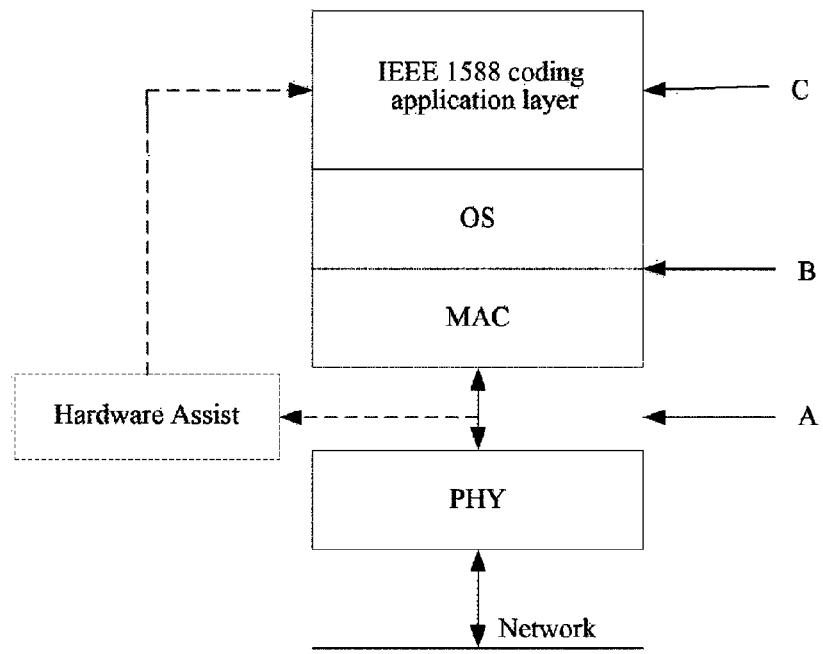
FIG. 1 is a diagram of 1588 message generation and time stamp processing according to existing technologies.
Figure 2:
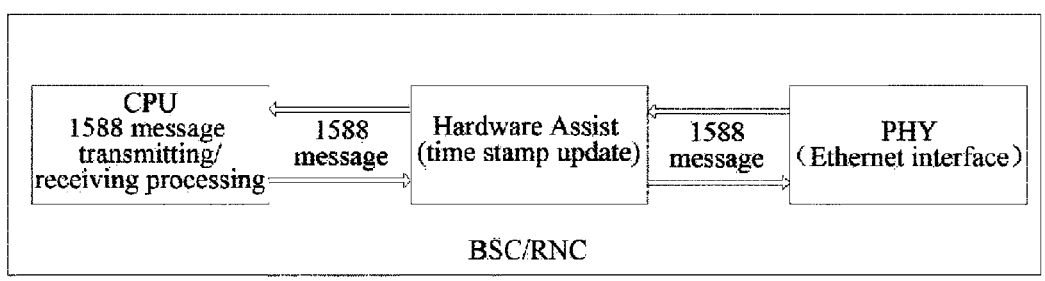
FIG. 2 is a diagram of 1588 message generation and time stamp processing procedures according to the existing device.
Figure 3:
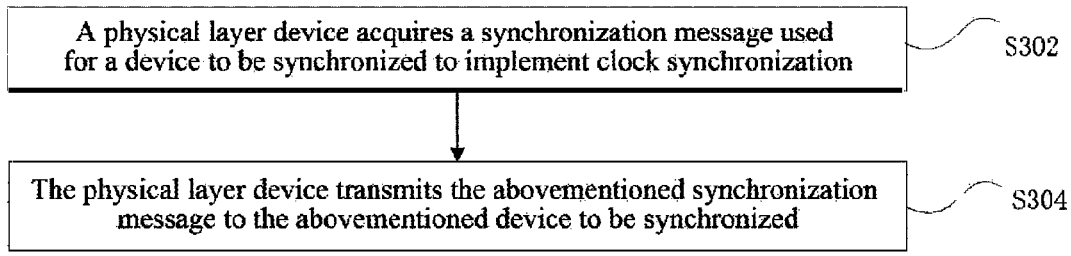
FIG. 3 is a flowchart of a clock synchronization method according to the embodiment of the present disclosure.

The embodiment of the present disclosure provides a clock synchronization method, as shown in FIG. 3 which is a flowchart of a clock synchronization method according to the embodiment of the present disclosure, including the following steps (Steps S302 to S304):

Step S302: a physical layer device acquires a synchronization message used for a device to be synchronized to implement clock synchronization.

Step S304: the physical side device transmits the synchronization message to the abovementioned device to be synchronized.

Through the abovementioned steps, a technical scheme is adopted that the synchronization message used for the device to be synchronized to implement clock synchronization is acquired through a physical layer device, but through a CPU, the problems of small user capacity of the load and high synchronization cost resulted from the clock synchronization method in conventional technologies are solved, the insufficient user capacity of the load caused by the limit of the CPU architecture is avoided, and the bandwidth resource of the Ethernet is utilized to the maximum extent.

In Step S302, namely, the step that the physical layer device acquires the synchronization message used for the device to be synchronized to implement clock synchronization includes that: the physical layer device generates an initial message; the abovementioned physical layer device acquires a reference time for synchronization and determines the time stamp of the initial message according to the reference time; and the abovementioned time stamp is added in the initial message to obtain the abovementioned synchronization message Alternatively, after the physical layer device acquires the synchronization message used for the device to be synchronized to implement clock synchronization, the method further includes that: the physical layer device generates a response message according to the synchronization message, herein the abovementioned response message is arranged to notify the device to be synchronized that the physical layer device has accepted the request of the device to be synchronized for implementing clock synchronization.

During process of specific implementation, the step that the abovementioned time stamp is added in the abovementioned initial message to obtain the abovementioned synchronization message includes that the following steps. The abovementioned physical layer device judges the priorities of a signaling message from a CPU and the abovementioned initial message when the initial message and the signaling message arrive at the same time. After judging that the priority of the initial message is higher than the priority of the signaling message, the abovementioned time stamp is added in the abovementioned initial message to determine the synchronization message.

Alternatively, the step that the abovementioned physical layer device acquires the reference time for synchronization includes: determining the abovementioned reference time according to at least one of the following: local clock source, GNSS and BITS.

In an alternative embodiment of the embodiments of the present disclosure, the step that the abovementioned physical layer device acquires the reference time for synchronization includes that: the abovementioned physical layer device receives the reference time acquired by an expansion board from the master clock of the physical layer device.

In order to better understand the working flowchart of the abovementioned clock synchronization, description is provided below in conjunction with FIG. 4 to FIG. 7.

Figure 4:
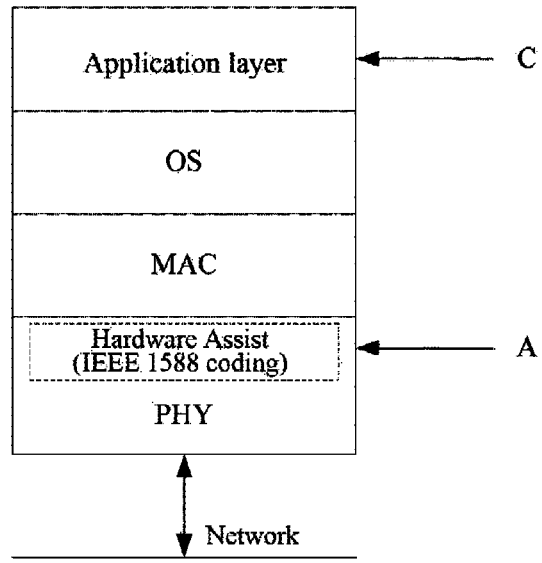
FIG. 4 is a Diagram 1 of message generation and time stamp processing procedures according to the embodiment of the present disclosure.
Figure 5:
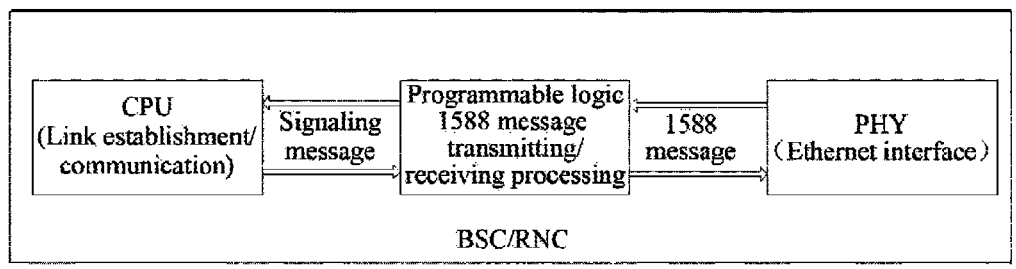
FIG. 5 is a Diagram 2 of message generation and time stamp processing procedures according to the embodiment of the present disclosure.

First Step: as shown in FIG. 4, to optimize the message processing and time stamp application structure of the IEEE 1588 protocol example, the receiving and transmitting processing and the time stamp update of the 1588 message are completed through the hardware assist function of a programmable logic at the physical (PHY) layer (point A). As shown in FIG. 5, at the application layer (that is, point C in FIG. 4) the 1588 message is not processed at all and only the system link establishment and communication function are completed. The user capacity that the IEEE 1588 master clock system of BSC/RNC can load is determined by the Ethernet bandwidth but by the CPU processing capability.

Figures 6, 7:
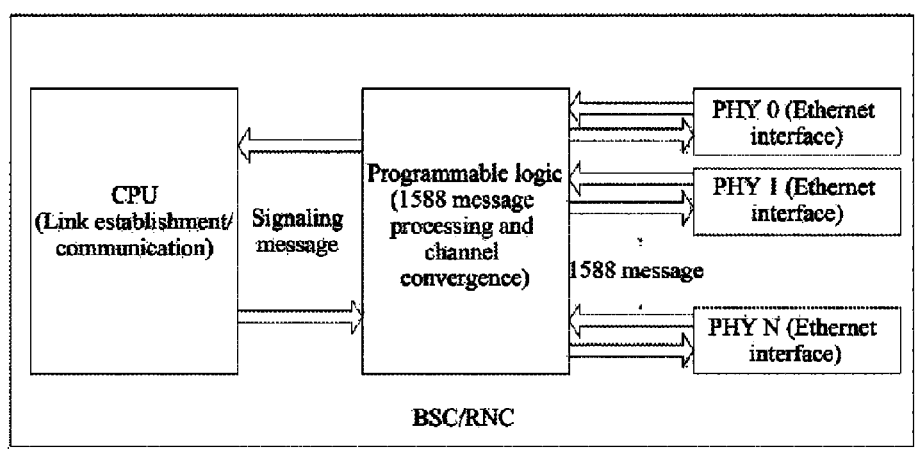
FIG. 6 is a diagram of a multi-channel design according to the embodiment of the present disclosure.
FIG. 7 is a diagram of a single-board expansion application design according to the embodiment of the present disclosure.

Second Step: based on the advantage that the CPU merely processes a few signaling messages, by utilizing the IEEE 1588 function that the CPU resource supports multiple channels, signaling messages of multiple channels are converged, through switch, to the CPU for link establishment and communication, the user capacity loaded by the IEEE 1588 master clock system of the BSC/RNC system increases by many times, as shown in FIG. 6.

Third Step: standard time is transmitted to expansion boards from master-slave clock boards through internal machine frame circuits, providing single-board expansion and channel expansion functions for a large capacity of users to access, as shown in FIG. 7. Herein, FAN in FIG. 7 may be understood as, but not limited to, one interface or the collection of multiple interfaces.

Figure 8:
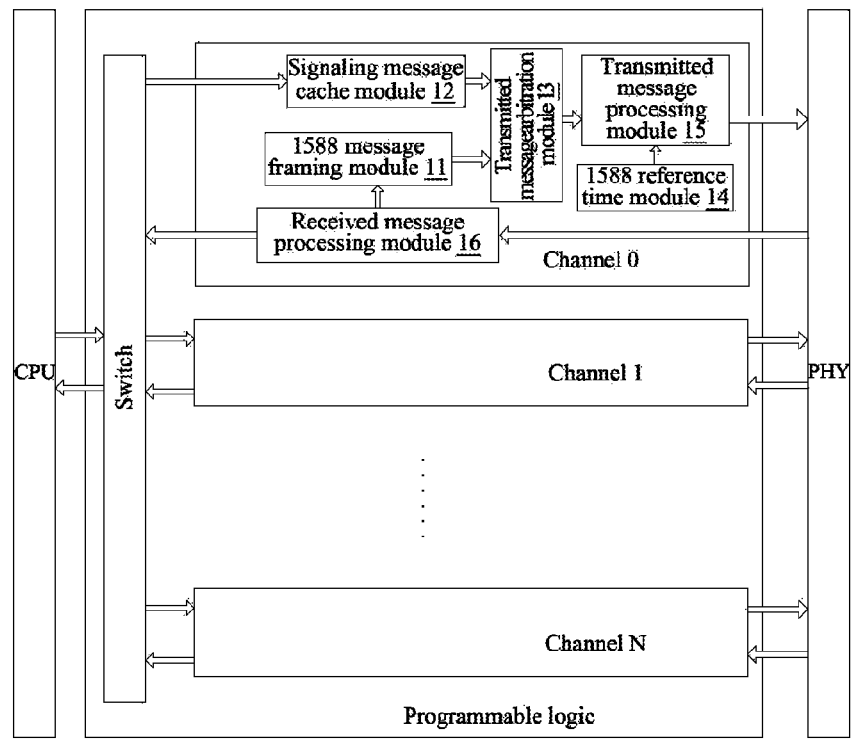
FIG. 8 is a diagram of the process of a physical layer device receiving and transmitting a message according to the embodiment of the present disclosure.

The working flows and internal architectures of physical layer devices in the embodiment of the present disclosure are further illustrated below, and they may be a programmable logic in an alternative embodiment of the present disclosure, as shown in FIG. 8.

1. A 1588 message framing module 11 is arranged to generate a corresponding 1588 message and meanwhile respond to, according to 1588 message information extracted by a received message processing module 16, the message correspondingly.

2. A signaling message cache module 12 is used for caching a signaling message received by the received message processing module 16 replied from a CPU, for a transmitted message arbitration module 13 to transmit.

3. The transmitted message arbitration module 13 is arranged to arbitrate, according to information such as priority, the messages of the 1588 message framing module 11 and the signaling message cache module 12, to complete the transmission of messages according to priorities.

4. A reference time module 14 is arranged to complete the generation of 1588 reference time through a local lock and a clock source (GNSS or BITS) and provide the reference time to a transmitted message processing module 15 as the time stamp information of the 1588 event message.

5. The transmitted message processing module 15 is arranged to complete the parse of a currently transmitted message and extract the information of the 1588 message. According to the time stamp information provided by the 1588 reference time module 14, functions such as update of the current 1588 message time stamp is completed.

6. The received message processing module 16 is arranged to complete the parse of a currently received message and extract the information of the 1588 message. The extracted 1588 message information is taken as the basic information of a message to be replied, for the 1588 message framing module 11 to frame.

In the alternative embodiment provided by FIG. 8, the connection between N Ethernet channels and the CPU is completed through a switch module, forming the link establishment and communication between each channel and the CPU. The signaling message received by each channel is processed by the CPU after being converged through a switching module, and the signaling message responded by the CPU is transmitted to each channel through the switch module.

In another alternative embodiment of the alternative embodiments of the present disclosure, the master clock board generates precision 1588 time using the GNSS or BITS clock and the local high-precision clock, and transmits the 1588 precision time to the expansion board through internal machine frame circuits. Then the 1588 precision time is given to, through the Ethernet interface of each channel, the user accessing the system, as the IEEE 1588 master clock.

In this alternative embodiment, the slave clock board gives time to the user accessing the system through the Ethernet interface of each channel, as the IEEE 1588 master clock. When the master clock board has a functional abnormality, precision 1588 time is provided to an expansion board, which provides the time service function when there is a large number of loaded users. The expansion board only provides single board expansion and channel expansion functions. The 1588 precision time needed by the expansion board is transmitted and acquired by the master clock board or slave clock board through machine frame circuits. The expansion board can flexibly select whether to arrange, how many to arrange and what machine frame arrangements.

To sum up, in the abovementioned technical scheme provided by the embodiment of the present disclosure, the receiving and transmission process of 1588 messages are directly completed at the PHY layer, thereby avoiding factors such as blocking and time delay that may probably occur in the time stamping of application messages framed to the PHY layer. Meanwhile, compared with the method that the CPU drives the receiving and transmitting of messages by relying on interrupt, the high-frequency precision timing method of the programmable logic makes the interval of packet transmission more accurate and further optimizes the IEEE 1588 synchronization performance.

Actually, the abovementioned technical scheme of clock synchronization provided by the embodiment of the present disclosure finally realizes great increase in the user capacity of the load. In the abovementioned technical scheme provided by the embodiment of the present disclosure, the programmable logic device of the hardware assist function of the BSC/RNC system replaces the CPU to process the 1588 message, thereby solving the limit problem for the user capacity of the load resulted from the CPU architecture design, such that the user capacity of the load is totally determined by the Ethernet bandwidth of the system. Through the multi-channel expansion design and the single-board expansion design of the machine frame, the user capacity of the load of the IEEE 1588 master clock system of BSC/RNC is greatly improved. Specific embodiments are described below from Ethernet interfaces of 10M/100M/1000M/10G respectively.

1. If the interface between systems is a 1000M Ethernet interface, the single-channel link has a bandwidth of 1000 Mbps. Under the 1588 one way mode, the data bandwidth is used to transmit a 1588 sync message and an announce message. If 1% bandwidth of each link is dedicated for signaling message link establishment and communication, the available bandwidth for the 1588 message is 990 Mbps. If an MAC message (sync packet has a length of 64 bytes, announce packet has a length of 82 bytes, response packet has a length of 72 bytes, inter-packet gap is 12 types) is used to bear 1588 information, under the condition of the minimum packet transmission interval defined by 1588V2 protocol (128 packets per second), the number of users that a single channel can load is: $990000000/((76+94)*128*8) =5687$; under the 1588 two way mode, besides transmitting sync, announce messages, it is also needed to reply a response message. Under the condition of the minimum packet transmission interval defined by 1588V2 protocol (128 packets per second), the number of users that a single channel can load is: $990000000/((76+94+84)*128*8)=3806$. Since the channel can be expanded into multiple channels (for example, common 8 channels, 4 channels, 12 channels, 16 channels and so on), plus the expansion capability of the machine frame (standard 1U machine frame is expanded into 4 boards, 2U machine frame is expanded into 8 boards, 3U machine frame is expanded into 12 boards), the apparatus provided by the present disclosure can load hundreds of thousands of users, even millions of users, in the 1000M Ethernet interface system.

2. If the interface between systems is a 100M Ethernet interface, the single-channel link has a bandwidth of 100 Mbps. Under the 1588 one way mode, the data bandwidth is used to transmit a 1588 sync message and an announce message. If 1% bandwidth of each link is dedicated for signaling message link establishment and communication, the available bandwidth for the 1588 message is 99 Mbps. If an MAC message (sync packet has a length of 64 bytes, announce packet has a length of 82 bytes, response packet has a length of 72 bytes, inter-packet gap is 12 types) is used to bear 1588 information, under the condition of the minimum packet transmission interval defined by 1588V2 protocol (128 packets per second), the number of users that a single channel can load is: $99000000/((76+94)*128*8) =568$. Under the 1588 two way mode, besides transmitting sync, announce messages, it is also needed to reply a response message. Under the condition of the minimum packet transmission interval defined by 1588V2 protocol (128 packets per second), the number of users that a single channel can load is: $99000000/((76+94+84)*128*8)=380$. Since the channel can be expanded into multiple channels (for example, common 8 channels, 4 channels, 12 channels, 16 channels and so on), plus the expansion capability of the machine frame (standard 1U machine frame is expanded into 4 boards, 2U machine frame is expanded into 8 boards, 3U machine frame is expanded into 12 boards), the apparatus provided by the present disclosure can load tens of thousands of users, even hundreds of thousands of users, in the 100M Ethernet interface system.

3. If the interface between systems is a 10M Ethernet interface, the single-channel link has a bandwidth of 10 Mbps. Under the 1588 one way mode, the data bandwidth is used to transmit a 1588 sync message and an announce message. If 1% bandwidth of each link is dedicated for signaling message link establishment and communication, the available bandwidth for the 1588 message is 9.9 Mbps. If an MAC message (sync packet has a length of 64 bytes, announce packet has a length of 82 bytes, response packet has a length of 72 bytes, inter-packet gap is 12 types) is used to bear 1588 information, under the condition of the minimum packet transmission interval defined by 1588V2 protocol (128 packets per second), the number of users that a single channel can load is: $9900000/((76+94)*128*8)=56$. Under the 1588 two way mode, besides transmitting sync, announce messages, it is also needed to reply a response message. Under the condition of the minimum packet transmission interval defined by 1588V2 protocol (128 packets per second), the number of users that a single channel can load is: $9900000/((76+94+84)*128*8)=38$. Since the channel can be expanded into multiple channels (for example, common 8 channels, 4 channels, 12 channels, 16 channels and so on), plus the expansion capability of the machine frame (standard 1U machine frame is expanded into 4 boards, 2U machine frame is expanded into 8 boards, 3U machine frame is expanded into 12 boards), the apparatus provided by the present disclosure can load thousands of users, even tens of thousands of users, in the 10M Ethernet interface system.

4. If the interface between systems is a 10G Ethernet interface, the single-channel link has a bandwidth of 10 Gbps. Under the 1588 one way mode, the data bandwidth is used to transmit a 1588 sync message and an announce message. If 1% bandwidth of each link is dedicated for signaling message link establishment and communication, the available bandwidth for the 1588 message is 9.9 Gbps. If an MAC message (sync packet has a length of 64 bytes, announce packet has a length of 82 bytes, response packet has a length of 72 bytes, inter-packet gap is 12 types) is used to bear 1588 information, under the condition of the minimum packet transmission interval defined by 1588V2 protocol (128 packets per second), the number of users that a single channel can load is: $9900000000/((76+94)*128*8) =56870$. Under the 1588 two way mode, besides transmitting sync, announce messages, it is also needed to reply a response message. Under the condition of the minimum packet transmission interval defined by 1588V2 protocol (128 packets per second), the number of users that a single channel can load is: $9900000000/((76+94+84)*128*8) =38062$. Since the channel can be expanded into multiple channels (for example, common 8 channels, 4 channels, 12 channels, 16 channels and so on), plus the expansion capability of the machine frame (standard 1U machine frame is expanded into 4 boards, 2U machine frame is expanded into 8 boards, 3U machine frame is expanded into 12 boards), the apparatus provided by the present disclosure can load millions of users, even tens of millions of users, in the 10G Ethernet interface system.

Figure 9:
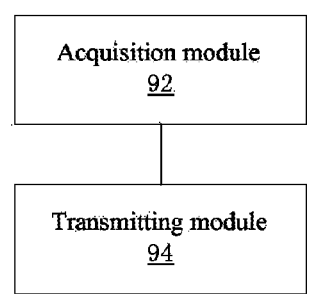
FIG. 9 is a structure diagram of a clock synchronization apparatus according to the embodiment of the present disclosure.

In this embodiment, a clock synchronization apparatus is further provided, which is applied to a physical layer device and is arranged to implement the abovementioned embodiments and alternative embodiments. Overlapping descriptions are omitted. Modules involved in this apparatus are described below. Term "module" used below can realize the combination of software and/or hardware with scheduled functions. Although the apparatus described in the following embodiments is implemented in the form of software in a better manner, the implementation in the form of hardware or the combination of software and hardware is possible and conceived. FIG. 9 is a structure diagram of a clock synchronization apparatus according to the embodiment of the present disclosure. As shown in FIG. 9, the apparatus includes:

an acquisition module 92, which is arranged to acquire a synchronization message used for a device to be synchronized to implement clock synchronization; and a transmitting module 94, which is arranged to transmit the abovementioned synchronization message to the abovementioned device to be synchronized.

Figure 10:
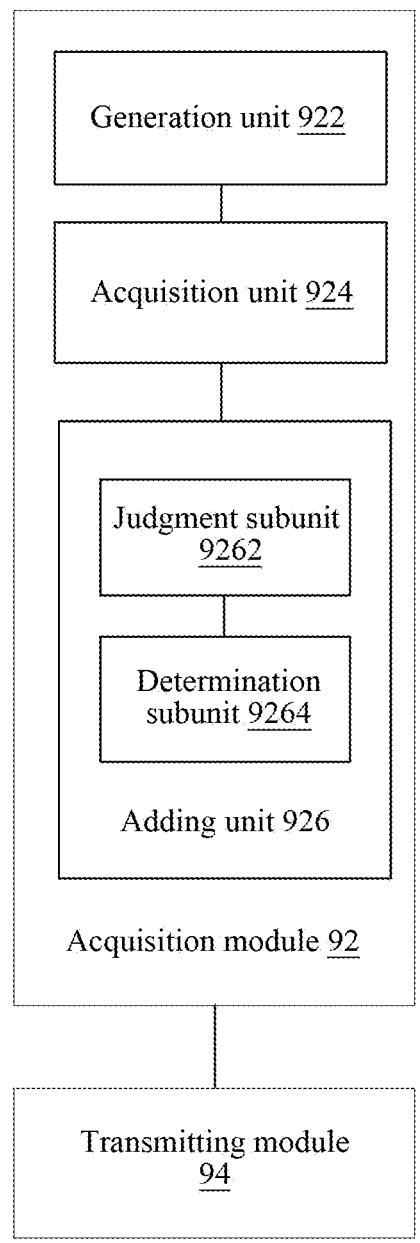
FIG. 10 is another structure diagram of a clock synchronization apparatus according to the embodiment of the present disclosure.

Herein, as shown in FIG. 10, the acquisition module 92 includes the following units. A generation unit 922 is arranged to generate an initial message. An acquisition unit 924 is connected with the generation unit 922 and is arranged to acquire a reference time for synchronization and determine the time stamp of the initial message according to the reference time. An adding unit 926, which is connected with the acquisition unit 924 and is arranged to add the time stamp into the initial message to determine the synchronization message.

The embodiment of the present disclosure has a further improvement made in view of the abovementioned technical scheme that the adding unit 926 includes the following subunits. A judgment subunit 9262 is arranged to judge the priorities of a signaling message from a CPU and the initial message when the initial message and the signaling message arrive at the same time. A determination subunit 9264 is connected with the judgment subunit 9262 and is arranged to add the time stamp into the initial message to determine the synchronization message, after judging that the priority of the second synchronization message is higher than the priority of the signaling message.

Alternatively, the acquisition unit 924 is arranged to acquire the reference time for synchronization, determines the reference time according to at least one of the following: local clock source, GNSS and BITS Alternatively, the acquisition unit 924 is further arranged to receive the reference time acquired by an expansion board from the master clock of the physical layer device.

Through the comprehensive function of the abovementioned modules, a technical scheme is adopted that the synchronization message used for the device to be synchronized to implement clock synchronization is acquired through a physical layer device, but through a CPU, the problems of small user capacity of the load and high synchronization cost resulted from the clock synchronization method in existing technologies are solved, the insufficient user capacity of the load caused by the limit of the CPU architecture is avoided, and the bandwidth resource of the Ethernet is utilized to the maximum extent.

The clock synchronization method and apparatus provided by the embodiment of the present disclosure belong to a brand new architecture, and comprehensively improve the user capacity of the system load from channel, inter-channel switch and single-board expansion inside a machine frame respectively. Meanwhile, the accurate timing method of the programmable logic avoids the problems of the inaccurate packet transmission interval of the application layer and blocking and time delay of messages from the application layer to the PHY layer, and further optimizes the 1588 synchronization performance. The embodiment of the present disclosure is applicable to all systems timed through the IEEE1588 master clock.

To sum up, the embodiment of the present disclosure achieves the following benefits: 1. The user capacity loaded by the IEEE 1588 master clock is improved from three aspects, namely, processing architecture of 1588 packet transmitting and receiving, multi-channel convergence and single-board expansion of machine frame, respectively. 2. The 1588synchronization performance of BSC/RNC is optimized.

In another embodiment, a kind of software is provided, which is arranged to implement the technical scheme described in the above embodiments and alternative embodiment.

In another embodiment, a storage medium is further provided, which stores the abovementioned software; the storage medium includes but not limited to: compact disc, floppy disk, hard disk, erasable memory and the like.

Apparently, those skilled in the art should understand that the modules or steps of the present disclosure described above can be implemented by a common computing device. The modules or steps can be integrated on a single computing device or distributed on a network composed of a plurality of computing devices. Alternatively, the modules or steps can be implemented by a programming code executable by a computing device, thus they can be stored in a storage device to be executed by a computing device and executed in a different order in some cases, or manufactured into individual integrated circuit module respectively, or several of them can be manufactured into a single integrated circuit module to implement. In this way, the present disclosure is not limited to any combination of specific hardware and software.

The above are merely the embodiments of the present disclosure and not intended to limit the present disclosure. For those skilled in the art, various modifications and changes can be made to the present disclosure. Any modification, equivalent substitute and improvement made within the spirit and principle of the present disclosure are intended to be included within the scope of protection of the present disclosure.

INDUSTRIAL APPLICABILITY

Based on the technical scheme adopted by the embodiment of the present disclosure, a technical scheme is adopted that the synchronization message used for the device to be synchronized to implement clock synchronization is acquired through a physical layer device, but through a CPU, the problems of small user capacity of the load and high synchronization cost resulted from the clock synchronization method in existing technologies are solved, the insufficient user capacity of the load caused by the limit of the CPU architecture is avoided, and the bandwidth resource of the Ethernet is utilized to the maximum extent.

What we claim is:

1. A method for clock synchronization, comprising:
    acquiring, by a physical layer device, a synchronization message used for a device to be synchronized to implement clock synchronization; and
    transmitting, by the physical layer device, the synchronization message to the device to be synchronized,
    wherein acquiring, by the physical layer device, the synchronization message used for the device to be synchronized to implement clock synchronization comprises:

generating, by the physical layer device, an initial message;

acquiring a reference time for synchronization and determining a time stamp of the initial message according to the reference time, by the physical layer device; and adding the time stamp into the initial message to obtain the synchronization message, wherein acquiring, by the physical layer device, the reference time for synchronization comprises: receiving, by the physical layer device, the reference time acquired by an expansion board from a master clock of the physical layer device.

2. The method according to claim 1, wherein after acquiring, by the physical layer device, the synchronization message used for the device to be synchronized to implement clock synchronization, the method further comprises:

generating, by the physical layer device, a response message according to the synchronization message, wherein the response message is used for notifying the device to be synchronized that the physical layer device has accepted a request of the device to be synchronized for implementing clock synchronization.

3. The method according to claim 1, wherein adding the time stamp into the initial message to obtain the synchronization message comprises:

judging, by the physical layer device, priorities of a signaling message from a Central Processing Unit, CPU, and the initial message when the initial message and the signaling message arrive at the same time;

after judging that the priority of the initial message is higher than the priority of the signaling message, adding the time stamp into the initial message to determine the synchronization message.

4. The method according to claim 3, wherein acquiring, by the physical layer device, the reference time for synchronization comprises: determining the reference time according to at least one of following: a local clock source, Global Navigation Satellite System, GNSS and Building Integrated Timing System, BITS.

5. An apparatus for clock synchronization, applied to a physical layer device, comprising:

an acquisition module, which is arranged to acquire a synchronization message used for a device to be synchronized to implement clock synchronization; and a transmitting module, which is arranged to transmit the synchronization message to the device to be synchronized, wherein the acquisition module comprises:

a generation unit, which is arranged to generate an initial message;

an acquisition unit, which is arranged to acquire a reference time for synchronization and determine a time stamp of the initial message according to the reference time; and an adding unit, which is arranged to add the time stamp into the initial message to determine the synchronization message, wherein the acquisition unit is further arranged to receive the reference time acquired by an expansion board from a master clock of the physical layer device.

6. The apparatus according to claim 5, wherein the adding unit comprises:

a judgment subunit, which is arranged to judge priorities of a signaling message from a Central Processing Unit, CPU, and the initial message when the initial message and the signaling message arrive at the same time; and a determination subunit, which is arranged to add the time stamp into the initial message to determine the synchronization message, after judging that the priority of the initial message is higher than the priority of the signaling message.

7. The apparatus according to claim 6, wherein the acquisition unit, which is arranged to acquire the reference time for synchronization, comprising: determining the reference time according to at least one of following: a local clock source, Global Navigation Satellite System, GNSS and Building Integrated Timing System, BITS.

\* \* \* \* \*